(12) United States Patent
Nakajima et al.

(10) Patent No.: US 9,557,721 B2
(45) Date of Patent: Jan. 31, 2017

(54) INPUT DEVICE HAVING CAPACITANCE DETECTORS AND NOISE IMMUNITY

(71) Applicant: ALPS ELECTRIC CO., LTD., Ota-ku, Tokyo (JP)

(72) Inventors: Satoshi Nakajima, Tokyo (JP); Satoshi Hayasaka, Tokyo (JP); Shinichi Endo, Tokyo (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 580 days.

(21) Appl. No.: 13/926,338

(22) Filed: Jun. 25, 2013

(65) Prior Publication Data

US 2014/0046460 A1    Feb. 13, 2014

(30) Foreign Application Priority Data

Aug. 8, 2012  (JP) .................................. 2012-175487

(51) Int. Cl.
  *G05B 11/01*    (2006.01)
  *G06F 3/044*    (2006.01)

(52) U.S. Cl.
  CPC .............. *G05B 11/01* (2013.01); *G06F 3/044* (2013.01)

(58) Field of Classification Search
  None
  See application file for complete search history.

(56) References Cited

U.S. PATENT DOCUMENTS

| | | | | |
|---|---|---|---|---|
| 4,550,221 A | * | 10/1985 | Mabusth | G06F 3/03547 178/18.06 |
| 6,239,788 B1 | * | 5/2001 | Nohno | G06F 3/0412 178/18.03 |
| 7,663,607 B2 | * | 2/2010 | Hotelling | G06F 3/0416 178/18.01 |
| 2002/0051007 A1 | * | 5/2002 | Kitagawa | H04N 19/186 345/660 |
| 2010/0044122 A1 | * | 2/2010 | Sleeman | G01D 5/2405 178/18.06 |

(Continued)

FOREIGN PATENT DOCUMENTS

JP    2011-100215    5/2011

*Primary Examiner* — Robert Fennema
*Assistant Examiner* — Jay Jung
(74) *Attorney, Agent, or Firm* — Hunton & Williams LLP

(57) ABSTRACT

An input device includes a coordinate input unit including capacitance detectors, a capacitance measuring unit that measures the capacitances of the capacitance detectors and outputs them as measurement signals by performing A/D conversion, and a control unit that controls the capacitance measuring unit, obtains the signals while associating them with coordinate information of the capacitance detectors, calculates first data signals that are difference values between the measurement signals and a reference value, performs a calculation for the first data signals, outputs control signals based on the calculation result, performs a first calculation in which the first data signals obtained after performing a noise removal process are associated with the coordinate information as second data signals and a second calculation in which the second signals obtained after performing a smoothing process are associated with the coordinate information as third data signals, and calculates an operation position using the third data signals.

1 Claim, 12 Drawing Sheets

(56) References Cited

U.S. PATENT DOCUMENTS

| | | | | |
|---|---|---|---|---|
| 2013/0156091 A1* | 6/2013 | Li | .................... | H04N 19/115 |
| | | | | 375/240.01 |
| 2013/0176268 A1* | 7/2013 | Li | .................... | G06F 3/044 |
| | | | | 345/174 |
| 2014/0104234 A1* | 4/2014 | Chang | .................... | G06F 3/044 |
| | | | | 345/174 |

* cited by examiner

| n \ m | 1 | 2 | 3 | 4 | 5 | 6 | 7 | 8 |
|---|---|---|---|---|---|---|---|---|
| 8 | 128 | 128 | 128 | 128 | 128 | 128 | 128 | 128 |
| 7 | 128 | 128 | 256 | 384 | 256 | 128 | 128 | 128 |
| 6 | 128 | 256 | 576 | 640 | 576 | 256 | 128 | 128 |
| 5 | 128 | 384 | 640 | 768 | 640 | 384 | 128 | 128 |
| 4 | 128 | 256 | 576 | 640 | 768 | 256 | 128 | 128 |
| 3 | 128 | 128 | 256 | 384 | 256 | 128 | 128 | 128 |
| 2 | 128 | 128 | 128 | 128 | 128 | 128 | 768 | 128 |
| 1 | 128 | 128 | 128 | 128 | 128 | 128 | 128 | 128 |

| n \ m | 1 | 2 | 3 | 4 | 5 | 6 | 7 | 8 |
|---|---|---|---|---|---|---|---|---|
| 8 | 0 | 0 | 0 | 0 | 0 | 0 | 0 | 0 |
| 7 | 0 | 0 | 128 | 256 | 128 | 0 | 0 | 0 |
| 6 | 0 | 128 | 448 | 512 | 448 | 128 | 0 | 0 |
| 5 | 0 | 256 | 512 | 640 | 512 | 256 | 0 | 0 |
| 4 | 0 | 128 | 448 | 512 | 640 | 128 | 0 | 0 |
| 3 | 0 | 0 | 128 | 256 | 128 | 0 | 0 | 0 |
| 2 | 0 | 0 | 0 | 0 | 0 | 0 | 640 | 0 |
| 1 | 0 | 0 | 0 | 0 | 0 | 0 | 0 | 0 |

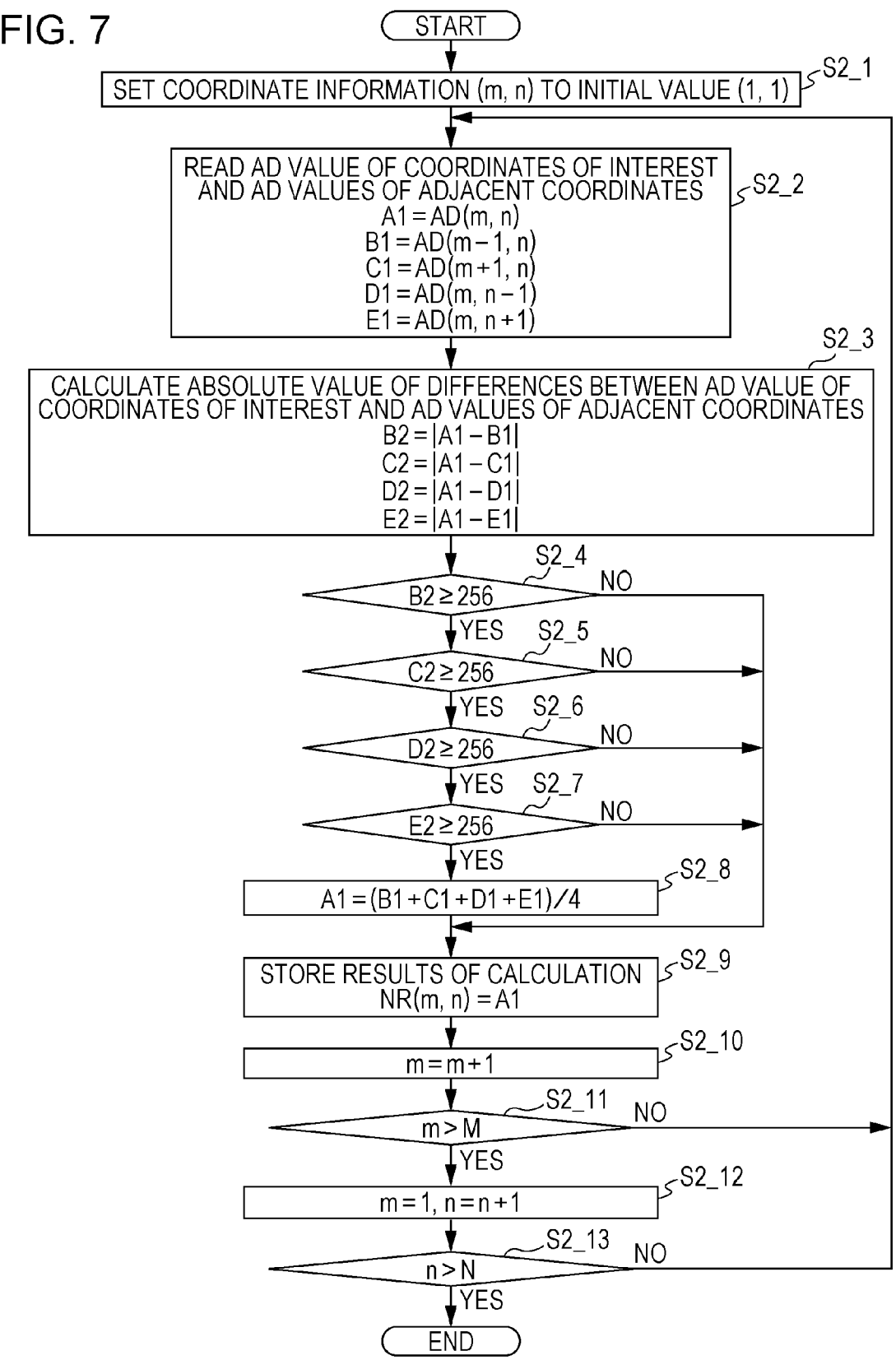

| n \ m | 1 | 2 | 3 | 4 | 5 | 6 | 7 | 8 |
|---|---|---|---|---|---|---|---|---|
| 8 | 0 | 0 | 0 | 0 | 0 | 0 | 0 | 0 |
| 7 | 0 | 0 | 128 | 256 | 128 | 0 | 0 | 0 |
| 6 | 0 | 128 | 448 | 512 | 448 | 128 | 0 | 0 |
| 5 | 0 | 256 | 512 | 640 | 512 | 256 | 0 | 0 |
| 4 | 0 | 128 | 448 | 512 | 640 | 128 | 0 | 0 |
| 3 | 0 | 0 | 128 | 256 | 128 | 0 | 0 | 0 |
| 2 | 0 | 0 | 0 | 0 | 0 | 0 | 0 | 0 |
| 1 | 0 | 0 | 0 | 0 | 0 | 0 | 0 | 0 |

| n \ m | 1 | 2 | 3 | 4 | 5 | 6 | 7 | 8 |
|---|---|---|---|---|---|---|---|---|
| 8 | 0 | 8 | 32 | 48 | 32 | 8 | 0 | 0 |
| 7 | 8 | 60 | 160 | 216 | 160 | 60 | 8 | 0 |
| 6 | 32 | 160 | 344 | 432 | 344 | 160 | 32 | 0 |
| 5 | 48 | 216 | 432 | 540 | 456 | 228 | 48 | 0 |
| 4 | 32 | 160 | 344 | 456 | 392 | 184 | 32 | 0 |
| 3 | 8 | 60 | 160 | 228 | 184 | 72 | 8 | 0 |
| 2 | 0 | 8 | 32 | 48 | 32 | 8 | 0 | 0 |
| 1 | 0 | 0 | 0 | 0 | 0 | 0 | 0 | 0 |

# INPUT DEVICE HAVING CAPACITANCE DETECTORS AND NOISE IMMUNITY

CLAIM OF PRIORITY

This application contains subject matter related to and claims the benefit of Japanese Patent Application No. 2012-175487 filed on Aug. 8, 2012, the entire contents of which is incorporated herein by reference.

BACKGROUND OF THE DISCLOSURE

1. Field of the Disclosure

The present disclosure relates to input devices, and more particularly to an input device with good noise immunity and good operability.

2. Description of the Related Art

In the related art, there is a capacitive input device that determines an operation position by sensing a variation in capacitance along with input operation.

An operator can intuitively perform an input operation on a capacitive input device in contrast to an input device that has certain operation units such as a switch and a rotary encoder and that is to be operated in a certain manner. Therefore, such a capacitive input device has been applied to various devices and is being used in increasingly diverse environments.

Japanese Unexamined Patent Application Publication No. 2011-100215 discloses an input device having a configuration in which an operation position is calculated by defining a region in which a variation in capacitance along with operation is large and performing a weighted average calculation.

An input device described in Japanese Unexamined Patent Application Publication No. 2011-100215 will be described below with reference to FIGS. 12 to 14 thereof. FIG. 12 is a diagram illustrating the configuration of an input device 900 of the related art. FIG. 13 is an operation timing chart of the input device 900 of the related art. FIG. 14 is a diagram illustrating the states of a region extraction process and a weighted average calculation performed by the input device 900 of the related art.

As illustrated in FIG. 12, the input device 900 described in Japanese Unexamined Patent Application Publication No. 2011-100215 includes a detection panel 911 configured to be operated by an object to be detected such as a finger of a person or a pen, a drive means 921 configured to drive electrodes 913 of the detection panel 911, a current measuring means 931 configured to measure electric charges or current from detection electrodes 914 of the detection panel 911, an insulating means 912 configured to be interposed between the drive electrodes 913 and the detection electrodes 914, a coordinate calculating means 951 configured to determine a position of an object that is to be detected by performing a calculation using the value of the current that is measured by the current measuring means 931, and a control means 971 configured to manage the overall state of the input device 900 and the overall process.

The drive means 921 charges and discharges capacitances that are generated at intersection points of the drive electrodes 913 and the detection electrodes 914 by varying the voltage of each of the drive electrodes 913. The current measuring means 931 measures the capacitances, which are generated at the intersection points of the drive electrodes 913 and the detection electrodes 914, by measuring charging and discharging currents of the capacitances, which are generated at the intersection points of the drive electrodes 913 and the detection electrodes 914.

As illustrated in FIG. 13, in the case where driving of a plurality of cycles and current measurement are performed when capacitances are measured, it is necessary to accumulate a plurality of measurements in order to reduce the influence of noise.

In the region extraction process, values in a region that is pressed by a finger or pen are extracted from values that correspond to the capacitances at the intersection points of the drive electrodes 913 and the detection electrodes 914, and an indication position is calculated by performing a weighted average calculation.

FIG. 14 illustrates the state of the region extraction process and the weighted average calculation. In FIG. 14, vertical lines represent coordinates of the drive electrodes 913, and horizontal lines represent coordinates of the detection electrodes 914. The sizes of black dots at intersection points correspond to the values of the capacitances at the corresponding intersection points. In each of the areas that are surrounded by dotted lines, a group of the intersection points that are adjacent to each other and at which the capacitances having a value larger than a predetermined value are generated, and each of the groups corresponds to, for example, a variation range in the capacitances due to one indicator such as one finger. X marks represent positions that are calculated as indication coordinates by a weighted average calculation.

However, although an accumulation process has been performed as a measure of noise in the above-described related art, it is necessary to increase the number of accumulations in order to improve the noise removal effect in the accumulation process, and thus, the processing speed is reduced. As a result, there have been problems in that the followability with respect to an input operation is impaired, and the operability deteriorates.

In addition, since a weighted average calculation is simply performed on only the values within the region, which have been extracted, there have been problems in that the coordinates of an operation position may be falsely calculated, and a malfunction such as a false detection may occur in the case where noise is not completely removed through the accumulation process.

These and other drawbacks exist.

SUMMARY OF THE DISCLOSURE

The present disclosure provides an input device with good noise immunity, good followability with respect to an input operation, and good operability.

An input device according to various embodiments includes a coordinate input unit that includes a plurality of capacitance detectors and on which an operating body performs an operation, a capacitance measuring unit that measures a capacitance of each of the plurality of capacitance detectors and outputs the capacitance, which has been measured, as a measurement signal by performing an analog-to-digital conversion, and a control unit that controls the capacitance measuring unit, obtains the measurement signal while associating the measurement signal with the coordinate information of the corresponding capacitance detector, calculates a first data signal that is a difference value between the measurement signal and a reference value, performs a calculation for the first data signal, and outputs a control signal on the basis of the result of the calculation. The control unit performs a first calculation in which a noise removal process is performed on the first data signal and in which the first data signal, on which the noise removal process has been performed, is associated with the coordinate information as a second data signal, performs a second calculation in which a smoothing process is performed on the second data signal and in which the second data signal, on which the smoothing process has been performed, is associated with the coordinate information as a third data signal, and calculates an operation position using the third data signal.

Therefore, the accurate coordinates of an operation position can be calculated by reducing the influence of noise, and the input device has a short response time because a calculation can be performed without performing data accumulation several times. Thus, an input device with good followability with respect to an input operation and good operability can be provided.

In the input device according various embodiments, the noise removal process may be performed using the first data signal that is associated with one set of coordinates of interest included in the coordinate information and the first data signals that are associated with a plurality of adjacent coordinates adjacent to the coordinates of interest, and the smoothing process may be performed using the second data signal that is associated with the one set of coordinates of interest included in the coordinate information and the second data signals that are associated with the plurality of adjacent coordinates adjacent to the coordinates of interest.

Therefore, noise by which only the value of a particular set of coordinates becomes an abnormal value can be more effectively removed.

In the input device according to the various embodiments, the smoothing process may be a weighted average process based on a Gaussian function.

Therefore, the third data signal that corresponds to the coordinates of an operation position becomes the largest value, and the value of the third data signal at a position that is spaced apart from the operation position decreases as the distance between the position and the operation position increases. Thus, a smoothing process in accordance with the distance can be performed, and as a result, the precision with which the operation position is detected can be improved.

In the input device according to the various embodiments, in the noise removal process, the value of the first data signal that is associated with the coordinates of interest may be replaced by the average value of the first data signals that are associated with the plurality of adjacent coordinates when differences between the first data signal that is associated with the coordinates of interest and each of the first data signals that are associated with the plurality of adjacent coordinates become equal to or greater than an abnormal value determination threshold.

Therefore, noise can be effectively removed without performing data accumulation several times.

As described above, according to the present disclosure, an input device with good noise immunity, good followability with respect to an input operation, and good operability can be provided.

BRIEF DESCRIPTION OF THE DRAWINGS

FIG. 7 is a flowchart illustrating a detailed operation procedure of step S2 of FIG. 3;

DETAILED DESCRIPTION OF THE DISCLOSURE

The following description is intended to convey a thorough understanding of the embodiments described by providing a number of specific embodiments and details involving a pressing force input device. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

An input device 100 according to various embodiments of the present disclosure will now be described below.

Figure 1:
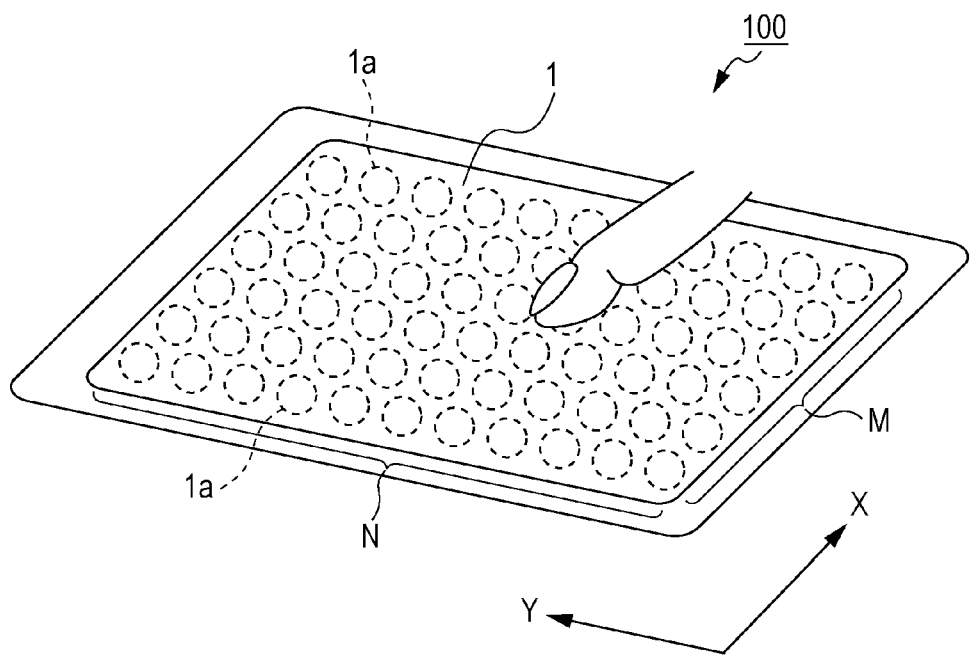
FIG. 1 is an external schematic diagram of an input device according to an exemplary embodiment of the present disclosure.
Figure 2:
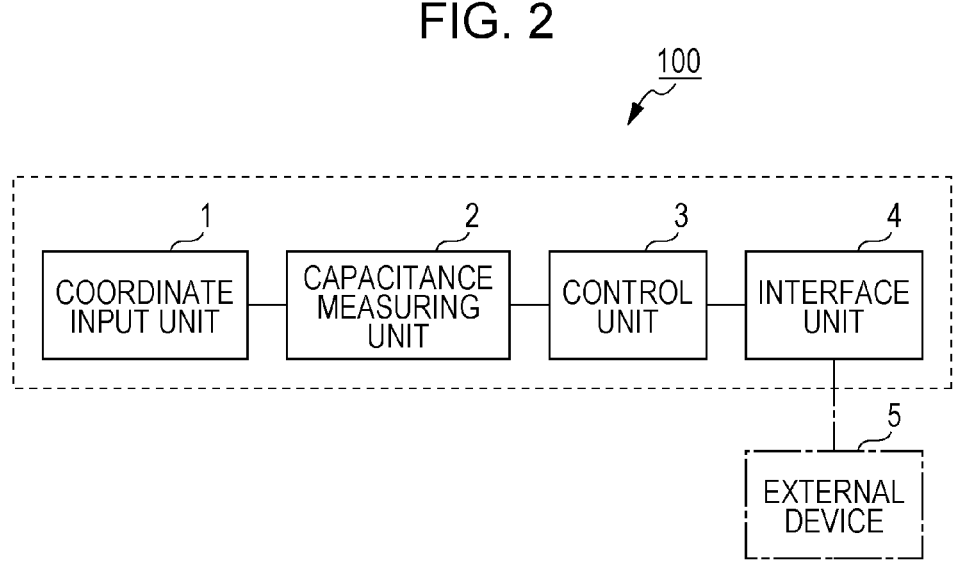
FIG. 2 is a block diagram illustrating the configuration of the input device according to an exemplary embodiment of the present disclosure.

First, the configuration of the input device 100 according to embodiments of the present disclosure will be described with reference to FIGS. 1 and 2. FIG. 1 is an external schematic diagram of the input device 100, and FIG. 2 is a block diagram illustrating the configuration of the input device 100.

As illustrated in FIG. 1, the input device 100 may include a coordinate input unit 1 that may include a plurality of capacitance detectors 1a, a capacitance measuring unit 2 that may be connected to the coordinate input unit 1, and a control unit 3 that may be connected to the capacitance measuring unit 2.

As illustrated in FIG. 1, the input device 100 may include the coordinate input unit 1 on which an operator performs an input operation by bringing their finger or the like close to or into contact with the coordinate input unit 1. The capacitance detectors 2a M of which may be arranged in the X direction and N of which may be arranged in the Y direction perpendicular to the X direction in a matrix form are provided along an input operation surface of the coordinate input unit 1. Note that M and N may be natural numbers.

Each of the capacitance detectors 1*a* may include a capacitance, and when the operator brings their finger or the like into contact with the coordinate input unit 1 in order to perform an input operation, the capacitance of the capacitance detector 1*a* at a position that has been touched and the capacitances of the capacitance detectors 1*a* in the vicinity of the position increase.

As illustrated in FIG. 2, the input device 100 may include the coordinate input unit 1, the capacitance measuring unit 2, which may be connected to the coordinate input unit 1, and the control unit 3, which may be connected to the capacitance measuring unit 2.

The capacitance measuring unit 2 may measure the capacitance of each of the plurality of capacitance detectors 1*a* and outputs an analog-to-digital conversion signal (an ADC signal) that may be obtained after converting the capacitance, which has been measured, from an analog signal into a digital signal to the control unit 3 as a measurement signal.

The control unit 3 may control the capacitance measuring unit 2, obtain the measurement signal of each of the capacitance detectors 1*a*, and associate the measurement signal, which has been obtained, with the coordinate information of the corresponding capacitance detector 1*a*. The control unit 3 may calculate a first data signal by using the measurement signal and outputs a control signal on the basis of the result of the calculation for the first data signal.

The input device 100 may be connected to an external device 5 via an interface unit 4 and supplied with electricity for operation of the input device 100 from the external device 5. The input device 100 may output the control signal, which may be output from the control unit 3, to the external device 5 and may output a control signal that is output from the external device 5 for the input device 100 to the control unit 3.

Figure 3:
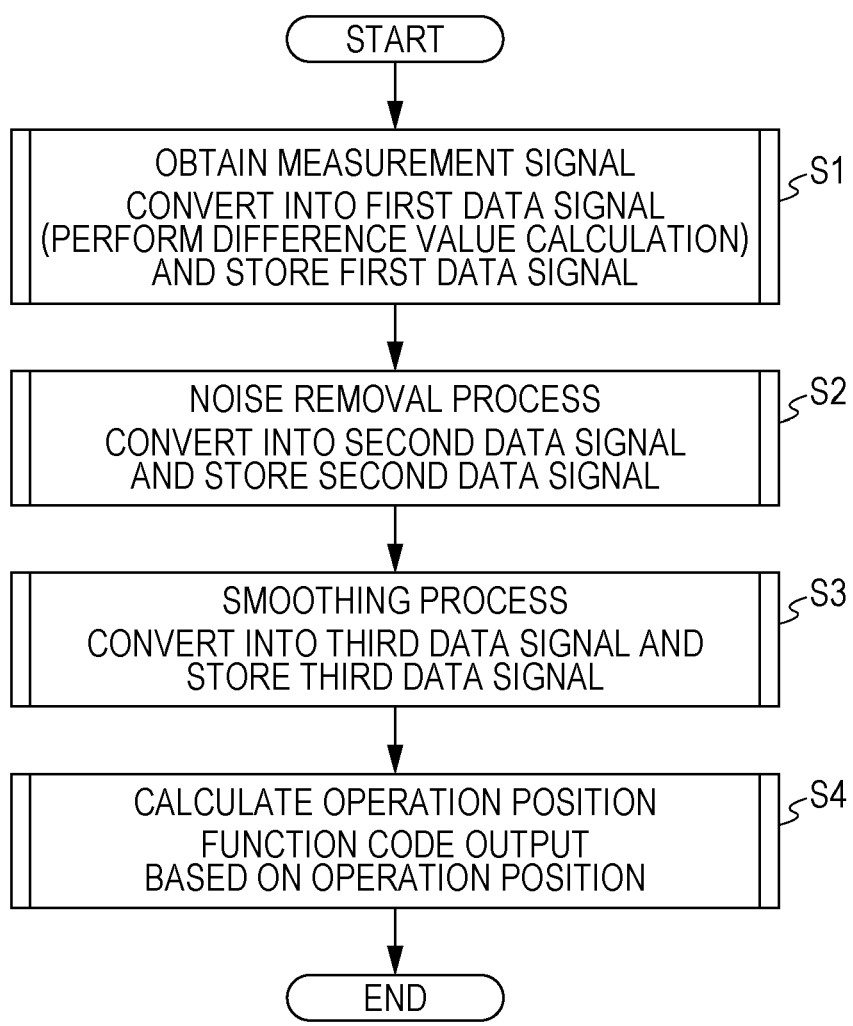
FIG. 3 is a flowchart illustrating an overview of the operation of the input device according to an exemplary embodiment of the present disclosure.

FIG. 3 is a flowchart illustrating an overview of the operation of the input device 100 according to an exemplary embodiment.

First, in step S1, the control unit 3 may obtain the measurement signal of each of the capacitance detectors 1*a* by controlling the capacitance measuring unit 2, associate a difference value between the measurement signal and a predetermined reference value with the coordinate information of the corresponding capacitance detector 1*a* as the first data signal, and store the first data signal in a first data signal storage area that is included in the control unit 3.

Next, in step S2, a second data signal may be obtained by performing a noise removal process on the first data signal, associated with the coordinate information of the corresponding capacitance detector 1*a*, and stored in a second data signal storage area that may be included in the control unit 3.

In step S3, a third data signal may be obtained by performing a smoothing process on the second data signal, associated with the coordinate information of the corresponding capacitance detector 1*a*, and stored in a third data signal storage area that is included in the control unit 3.

In step S4, an operation position may be calculated from the third data signal, which has been obtained in step S3, and a control signal corresponding to the operation position is output.

Operation may be performed by repeating the operation procedure illustrated in the flowchart of FIG. 3 at regular intervals by using a time function or the like embedded in a control circuit.

The process from step S1 to step S4 illustrated in the flowchart of FIG. 3 will now be described in detail with reference to FIGS. 4 to 11.

Figure 4:
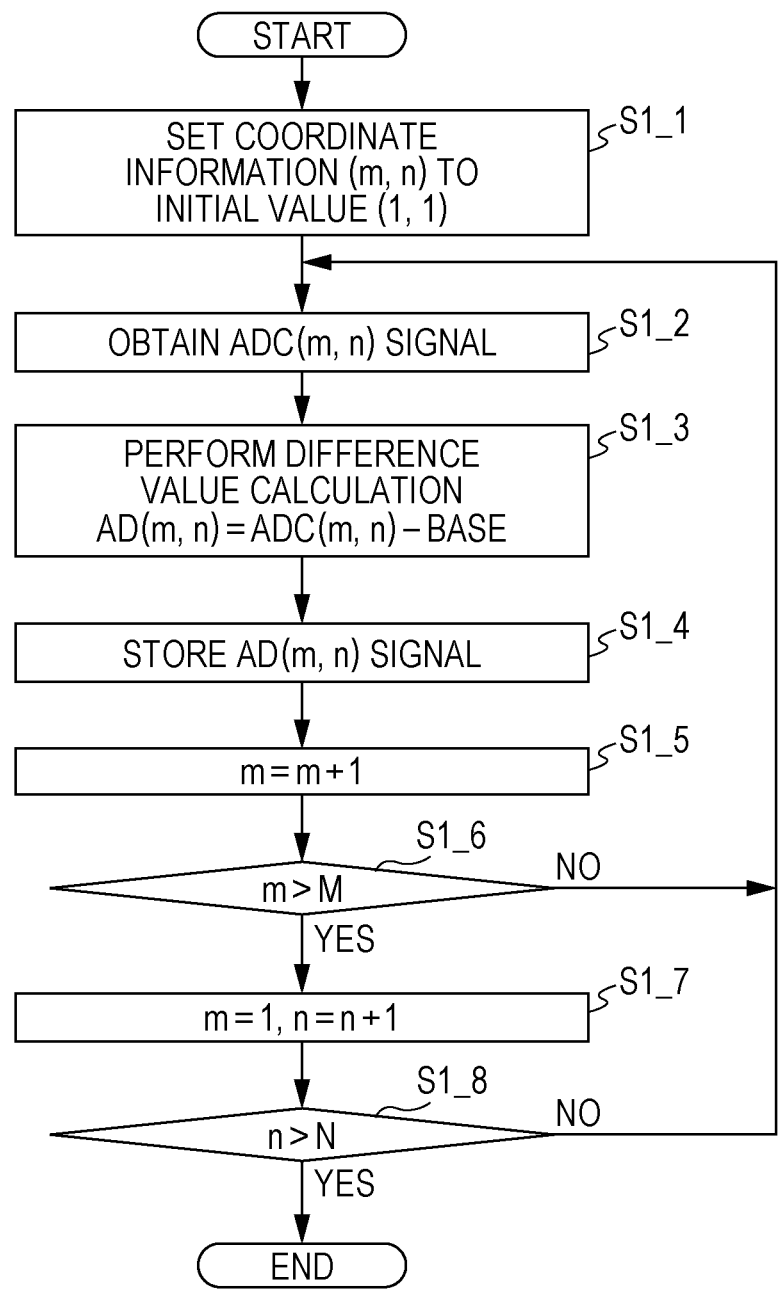
FIG. 4 is a flowchart illustrating a detailed operation procedure of step S1 of FIG. 3.

FIG. 4 is a flowchart illustrating a detailed operation procedure of step S1 in the flowchart illustrated in FIG. 3.

In the case where the coordinate information of the capacitance detector 1*a* that is the mth capacitance detector 1*a* in the X direction and the nth capacitance detector 1*a* in the Y direction among the capacitance detectors 1*a* the measurement signals of which are to be obtained is (m, n), the control unit 3 may set the coordinate information (m, n) to an initial value (e.g., m=1, n=1) in step S1_1 illustrated in the flowchart of FIG. 4. Then, the control unit 3 may obtain the measurement signal (ADC(m, n)) of the capacitance detector 1*a* corresponding to the coordinate information (m, n) in step S1_2.

In step S1_3, a difference value (AD(m, n)) between the measurement signal (ADC(m, n)), which has been obtained in step S1_2, and a predetermined reference value (BASE) may be calculated.

In step S1_4, the difference value (AD(m, n)), which has been calculated in step S1_3 may be stored into the first data signal storage area included in the control unit 3.

In step S1_5, the value of m of the coordinate information (m, n) may be incremented by one. In step S1_6, the value of m may be compared with a maximum value M. In the case where the value of m does not exceed the maximum value M, the process returns to step S1_2, and the measurement signal (ADC(m+1, n)) of the capacitance detector 1*a* corresponding to the coordinate information (m+1, n) of next coordinates that are updated is obtained. Then, the process from step S1_2 to step S1_6 may be repeated in the same manner as described above unless the value of m exceeds the maximum value M.

In the case where the value of m exceeds the maximum value M when the value of m may be compared with the maximum value M in step S1_6, the value of m may be reset to the initial value (e.g., 1), and the value of n may be incremented by one in step S1_7. Then, in step S1_8, the value of n may be compared with a maximum value N. In the case where the value of n does not exceed the maximum value N, the process may return to step S1_2, and the measurement signal (ADC(m, n+1)) of the capacitance detector 1*a* corresponding to the coordinate information (m, n+1) of next coordinates that are updated may be obtained. Then, the process from step S1_2 to step S1_8 may be repeated in the same manner as described above unless the value of n may exceed the maximum value N.

In the case where the value of n exceeds the maximum value N when the value of n is compared with the maximum value N in step S1_8, it means that all of the M×N capacitance detectors 1*a*, M of which are arranged in the X direction and N of which are arranged in the Y direction perpendicular to the X direction in a matrix form, have been scanned, the measurement signal (ADC(m, n)) of each of the capacitance detectors 1*a* has been obtained, and the difference values (AD(m, n)) have been calculated and stored. Therefore, the operation of step S1 in the flowchart of FIG. 3 may be exited.

Figures 5A, 5B:
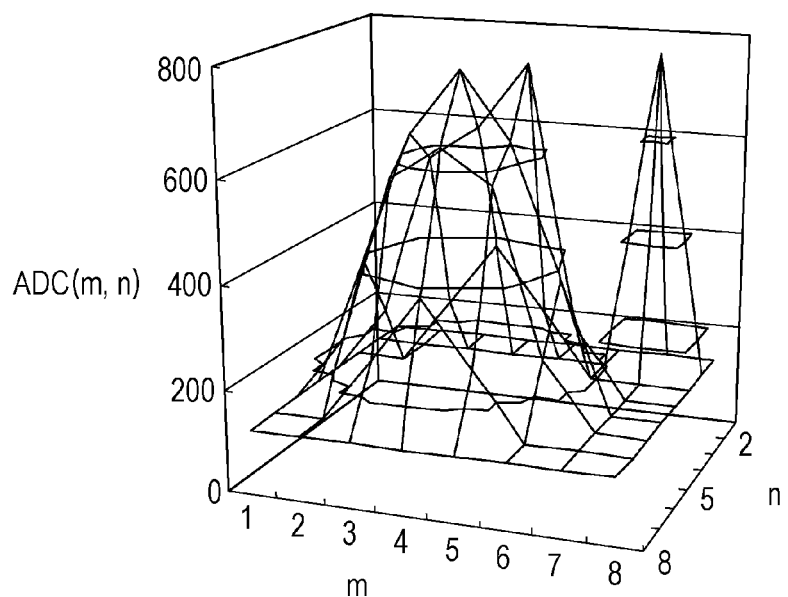
FIGS. 5A and 5B are explanatory diagrams that relate to measured values obtained through a measurement signal obtaining process of FIG. 4.

FIGS. 5A and 5B are explanatory diagrams that relate to the measured values obtained through the operation of the flowchart illustrated in FIG. 4. FIG. 5A illustrates examples of the measured values obtained in step S1_2. FIG. 5B is a contour graph showing the values shown in FIG. 5A. In order to make the following description simple, the values of m and n are in the range of 1 to 8, and there are 64 data items in total in each of FIG. 5A and FIG. 5B.

In FIGS. 5A and 5B, an input operation may be performed at a position corresponding to the coordinates (m=4, n=5), and thus, the value at the position corresponding to the coordinates (m=4, n=5) and the values at positions corresponding to the coordinates in the vicinity of the coordinates (m=4, n=5) may be large. Since noise may be superimposed on a signal along with an input operation at a position corresponding to the coordinates (m=5, n=4), the value at the position corresponding to the coordinates (m=5, n=4) may be the same as the value that is obtained in the case where a contact occurs as a result of an input operation. In FIGS. 5A and 5B, the value at a position corresponding to the coordinates (m=7, n=2) may be an exemplary value in the case where noise having a value the same as the value at a position at which an input operation is performed may be input at a position spaced apart from the position at which the input operation is performed.

Figures 6A, 6B:
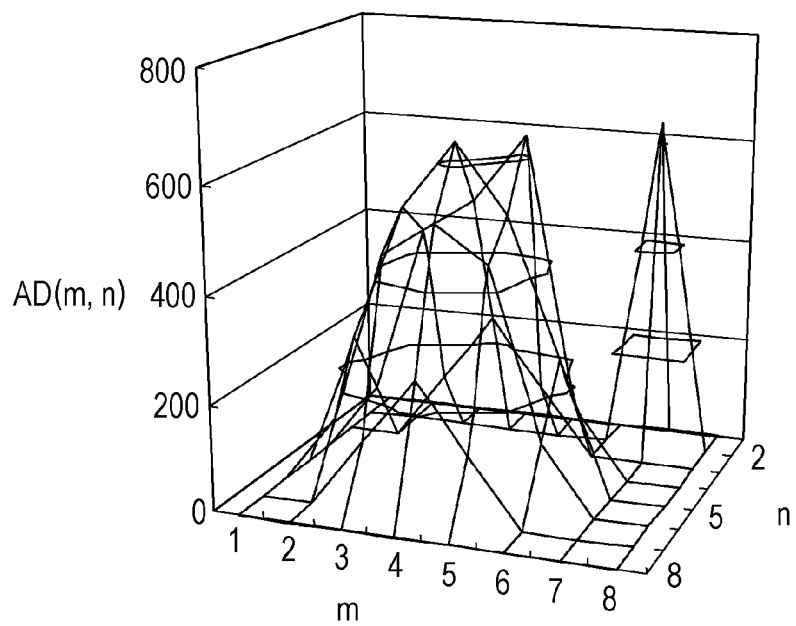
FIGS. 6A and 6B are explanatory diagrams that relate to difference values calculated through a difference value calculation process in FIG. 4.

FIGS. 6A and 6B are explanatory diagrams that relate to the difference values that are calculated through the operation of the flowchart illustrated in FIG. 4. FIG. 6A illustrates examples of the difference values calculated from the measured values obtained in step S1_2. FIG. 6B is a contour graph showing the values shown in FIG. 6A. The calculation for the difference values is performed using a reference value of 128.

FIG. 7 is a flowchart illustrating a detailed operation procedure of step S2 of the flowchart illustrated in FIG. 3.

In step S2_1 illustrated in the flowchart of FIG. 7, the control unit 3 may set the coordinate information of the coordinates of interest that is used when a noise removal process is performed to an initial value (m=1, n=1). In step S2_2, the control unit 3 may obtain the value of the difference value (AD(m, n)) that may correspond to the coordinates of interest and that has been calculated in step S1_3 described above and the values of difference values (AD(m−1, n), AD(m+1, n), AD(m, n−1), and AD (m, n+1)) that correspond to four adjacent coordinates adjacent to the coordinates of interest from the first data signal storage area.

In the case where the value of m is one and the value of n is one and in the case where the value of m is the maximum value M and the value of n is the maximum value N, the capacitance detectors 1a may not be present at the coordinates that are adjacent to the coordinates of interest and outside the coordinate input unit 1. Therefore, in the case where the value of m is one and the value of n is one, the difference values each of which corresponds to one set of the coordinates (m−1, n) and (m, n−1) among the difference values that correspond to the four adjacent coordinates adjacent to the coordinates of interest may not be present. In the case where the value of m is the maximum value M and the value of n is the maximum value N, the difference values each of which corresponds to one set of the coordinates (m+1, n) and (m, n+1) among the difference values that correspond to the four adjacent coordinates adjacent to the coordinates of interest may not be present. Therefore, the following steps will be performed using a predetermined fixed value as the difference values that are not present and each of which corresponds to one set of the adjacent coordinates.

In step S2_3, the absolute values of the differences between each of the difference values that correspond to the four adjacent coordinates and that have been obtained and the difference value that corresponds to the coordinates of interest and that has been obtained may be calculated. In step S2_4 to step S2_7, the absolute values of the differences between each of the difference values that correspond to the four adjacent coordinates and the difference value that corresponds to the coordinates of interest, which have been calculated in step S2_3 may be compared with an abnormal value detection threshold.

When it is determined that all of the absolute values of the differences between each of the difference values that correspond to the adjacent coordinates and the difference value that corresponds to the coordinates of interest are equal to or greater than the abnormal value detection threshold (256) in step S2_4 to step S2_7, the process may continue to step S2_8.

When it is determined that any one of the absolute values of the differences between each the difference values that correspond to the adjacent coordinates and the difference value that corresponds to the coordinates of interest is smaller than the abnormal value detection threshold in step S2_4 to step S2_7, the process may continue to step S2_9.

In step S2_8, the average of the difference values that correspond to the four adjacent coordinates may be calculated, and the difference value (A1) that has been obtained in step S2_2 and that corresponds to the coordinates of interest may be replaced by the average value, which may be calculated. Then, the process continues to step S2_9.

In step S2_9, the difference value (A1) that corresponds to the coordinates of interest and that has been obtained in step S2_2 to step S2_7 or step S2_8 may be stored in the second data signal storage area of the control unit 3 as the second data signal (NR(m, n)) on which a noise removal process has been performed. Then, the process may continue to step S2_10.

In step S2_10, the value of m of the coordinate information (m, n) may be incremented by one. In step S2_11, the value of m may be compared with the maximum value M. In the case where the value of m does not exceed the maximum value M, the process may return to step S2_2. The coordinate information (m+1, n) of next coordinates that are updated may be set as the coordinates of interest, and the difference value (AD(m+1, n)) that corresponds to the coordinates of interest (m+1, n) and the difference values (AD(m, n), AD(m+2, n), AD(m+1, n−1), and AD(m+1, n+1)) each of which corresponds to one set of four adjacent coordinates adjacent to the coordinates of interest are obtained from the first data signal storage area. Then, the process from step S2_2 to step S2_10 may be repeated in the same manner as described above unless the value of m exceeds the maximum value M.

In the case where the value of m exceeds the maximum value M when the value of m is compared with the maximum value M in step S2_11, the value of m may be reset to the initial value, and the value of n may be incremented by one in step S2_12. Then, in step S2_13, the value of n may be compared with the maximum value N. In the case where the value of n does not exceed the maximum value N, the process may return to step S2_2. The coordinate information (m, n+1) of next coordinates that are updated may be set as the coordinates of interest, and the difference value (AD(m, n+1)) that corresponds to the coordinates of interest (m, n+1) and difference values (AD(m−1, n+1), AD(m+1, n+1), AD(m, n), and AD(m, n+2)) each of which corresponds to one set of four adjacent coordinates adjacent to the coordinates of interest are obtained from the first data signal storage area. Then, the process from step S2_2 to step S2_12 may be repeated in the same manner as described above unless the value of n exceeds the maximum value N.

In the case where the value of n exceeds the maximum value N when the value of n is compared with the maximum value N in step S2_13, it means that the noise removal process has been performed on all of the M×N capacitance detectors 1*a*, M of which are arranged in the X direction and N of which are arranged in the Y direction that is perpendicular to the X direction in a matrix form, and that all of the M×N capacitance detectors 1*a* have been stored. Therefore, the operation of step S2 in the flowchart of FIG. 3 is exited.

Figures 8A, 8B:
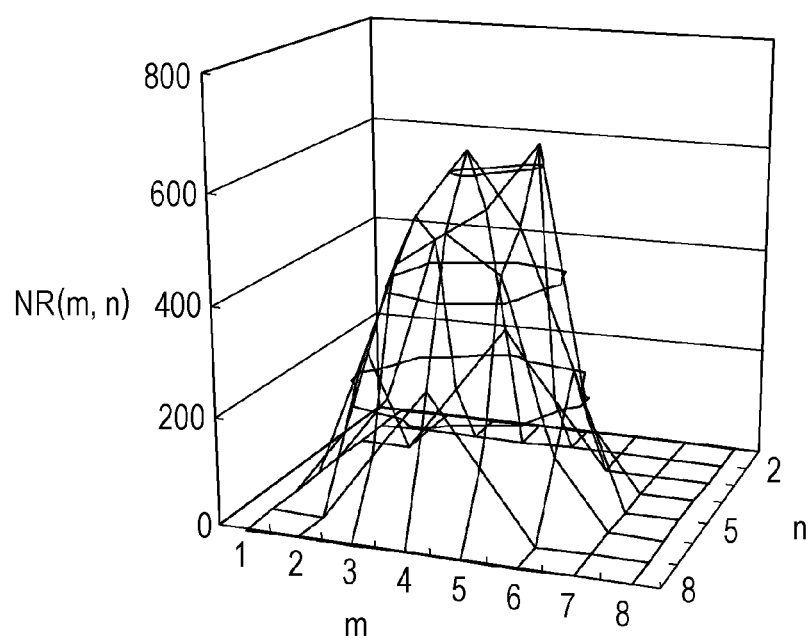
FIGS. 8A and 8B are explanatory diagrams that relate to values that are calculated in a noise removal process of FIG. 7 and on which the noise removal process has been performed.

FIGS. 8A and 8B are explanatory diagrams that relate to the values that are calculated in the noise removal process of FIG. 7 and on which the noise removal process has been performed and are diagrams illustrating the results obtained by performing the noise removal process of step S2 described above on the difference values (AD (m, n)) that have been calculated in step S1 illustrated in FIG. 6. Note that in the case where the difference value that corresponds to one set of the four adjacent coordinates adjacent to the coordinates of interest is not present, the calculation is performed using a fixed value that is 0 (zero) as the difference value that corresponds to one set of the adjacent coordinates and that is not present.

FIG. 8A illustrates the values (NR(m, n)) of the second data signals that are obtained by performing the noise removal process on the difference values (AD(m, n)) illustrated in FIG. 6A. FIG. 8B is a contour graph showing the values of the second data signals shown in FIG. 8A. The calculation may be performed using the abnormal value determination threshold (256) that is used to perform the noise removal process and used in step S2_4 to step S2_7 of FIG. 7.

As illustrated in FIGS. 8A and 8B, noise that is input at a position that corresponds to the coordinates (m=7, n=2) in the measured data illustrated in FIG. 5 and that is spaced apart from a position at which an input operation is performed may be effectively reduced.

As described above, among the difference values that are obtained by a single scanning and that correspond to all of the M×N capacitance detectors 1*a*, M of which are arranged in the X direction and N of which are arranged in the Y direction that is perpendicular to the X direction in a matrix form, the difference value (AD(m, n)) that corresponds to the coordinates of interest (m, n) is compared with the difference values (AD(m−1, n), AD(m+1, n), AD(m, n−1), and AD(m, n+1)) that correspond to the four adjacent coordinates adjacent to the coordinates of interest. In the case where there are significant differences between the difference value that corresponds to the coordinates of interest and each of the difference values that correspond to the four adjacent coordinates adjacent to the coordinates of interest, it may be determined that the difference value that corresponds to the coordinates of interest includes noise. Then, the average of the difference values that correspond to the four adjacent coordinates is calculated, and the difference value that corresponds to the coordinates of interest is replaced by the average value, which has been calculated. Therefore, the noise removal process can be effectively performed without performing an accumulation process.

Figure 9:
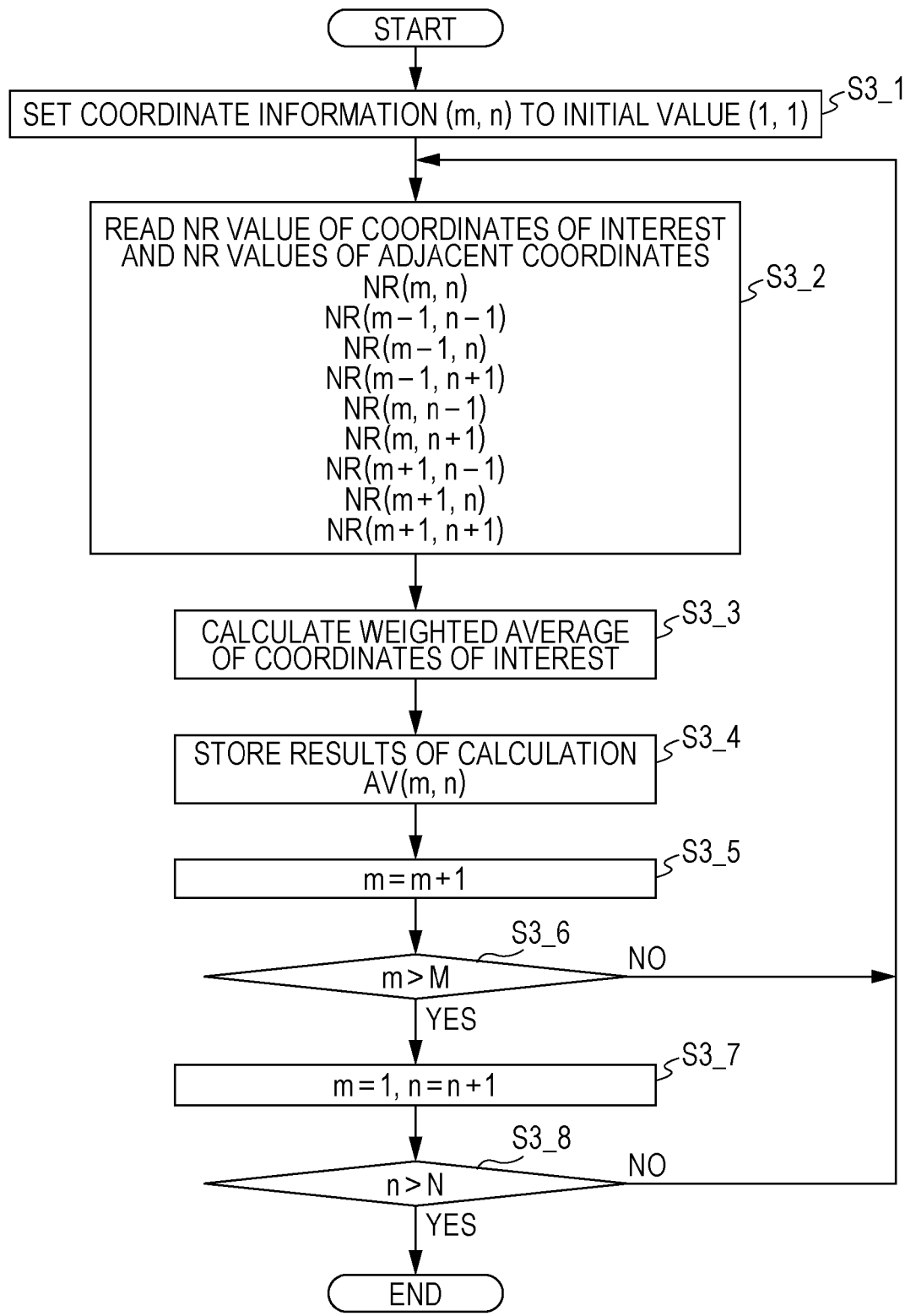
FIG. 9 is a flowchart illustrating a detailed operation procedure of step S3 of FIG. 3.

FIG. 9 is a flowchart illustrating a detailed operation procedure of step S3 of the flowchart illustrated in FIG. 3.

In step S3_1 illustrated in the flowchart of FIG. 9, the control unit 3 sets the coordinate information of the coordinates of interest that is used when the smoothing process is performed to the initial value (m=1, n=1). In step S3_2, the control unit 3 obtains the value of the second data signal (NR(m, n)) on which the noise removal process has been performed and which corresponds to the coordinates of interest calculated in step S2 described above and the values of the second data signals (NR(m−1, n−1), NR(m−1, n), NR(m−1, n+1), NR(m, n−1), NR(m, n+1), NR(m+1, n−1), NR(m+1, n), and NR(m+1, n+1)) on which the noise removal process has been performed and each of which corresponds to one set of eight adjacent coordinates adjacent to the coordinates of interest from the second data signal storage area.

In the case where the value of m is one and the value of n is one, and in the case where the value of m is the maximum value M and the value of n is the maximum value N, each of the cases showing the coordinates that correspond to one of the capacitance detectors 1*a* that is present at a position along the outer periphery of the coordinate input unit 1, the capacitance detectors 1*a* are not present at the coordinates that are adjacent to the coordinates of interest and outside the coordinate input unit 1. Therefore, in the case where the value of m is one, and the value of n is one, the second data signals on which the noise removal process has been performed and each of which corresponds to one set of the coordinates (m−1, n−1), (m−1, n), (m−1, n+1), (m, n−1), and (m+1, n−1) among the second data signals on which the noise removal process has been performed and which correspond to the eight adjacent coordinates adjacent to the coordinates of interest are not present. In the case where the value of m is the maximum value M, and the value of n is the maximum value N, the second data signals on which the noise removal process has been performed and each of which corresponds to one set of the coordinates (m−1, n+1), (m, n+1), (m+1, n−1), (m+1, n), and (m+1, n+1) among the second data signals on which the noise removal process has been performed and which correspond to the eight adjacent coordinates adjacent to the coordinates of interest are not present. Therefore, the following steps will be performed using a predetermined fixed value as the second data signals that are not present, on which the noise removal process has been performed, and each of which corresponds to one set of the adjacent coordinates.

In step S3_3, the weighted average (AV(m, n)) of the second data signal, which has been obtained, on which the noise removal process has been performed, and which corresponds to the coordinates of interest and the second data signals, which have been obtained, on which the noise removal process has been performed, and which correspond to the eight adjacent coordinates, may be calculated from a mathematical expression (Expression 1) showing the weighting based on a Gaussian function.

$$AV(m,n)=[4\times NR(m,n)+2\times\{NR(m-1,n)+NR(m,n-1)+NR(m,n+1)\times NR(m+1,n)\}+NR(m-1,n-1)+NR(m-1,n+1)+NR(m+1,n-1)+NR(m+1,n+1)]/16 \quad \text{(Expression 1)}$$

In step S3_4, the weighted average (AV(m, n)) of the coordinates of interest calculated in step S3_3 is stored in the third data signal storage area included in the control unit 3 as the third data signal (AV(m, n)) on which the smoothing process has been performed. Then, the process continues to step S3_5.

In step S3_5, the value of m of the coordinate information (m, n) may be incremented by one. In step S3_6, the value of m may be compared with the maximum value M. In the case where the value of m does not exceed the maximum value M, the process returns to step S3_2. The coordinate information (m+1, n) of next coordinates that are updated may be set as the coordinates of interest, and the value of the second data signal (NR(m+1, n)) on which the noise removal process has been performed and which corresponds to the coordinates of interest (m+1, n) and the values of the second data signals (NR(m, n−1), NR(m, n), NR(m, n+1), NR(m+1, n−1), NR(m+1, n+1), NR(m+2, n−1), NR(m+2, n), and NR(m+2, n+1)) each of which corresponds to one set of eight adjacent coordinates adjacent to the coordinates of interest are obtained from the second data signal storage area. Then, the process from step S3_2 to step S3_5 may be repeated in the same manner as described above unless the value of m exceeds the maximum value M.

In the case where the value of m exceeds the maximum value M when the value of m is compared with the maximum value M in step S3_6, the value of m may be reset to the initial value, and the value of n is incremented by one in step S3_7. Then, in step S3_8, the value of n may be compared with the maximum value N. In the case where the value of n does not exceed the maximum value N, the process returns to step S3_2. The coordinate information (m, n+1) of next coordinates that are updated may be set as the coordinates of interest and the value of the second data signal (NR(m, n+1)) on which the noise removal process has been performed and which corresponds to the coordinates of interest (m, n+1) and the values of the second data signals (NR(m−1, n), NR(m−1, n+1), NR(m−1, n+2), NR(m, n), NR(m, n+2), NR(m+1, n), NR(m+1, n+1), and NR(m+1, n+2)) on which the noise removal process has been performed and each of which corresponds to one set of eight adjacent coordinates adjacent to the coordinates of interest are obtained from the second data signal storage area. Then, the process from step S3_3 to step S3_7 may be repeated in the same manner as described above unless the value of n exceeds the maximum value N.

The value of n may be compared with the maximum value N in step S3_8. In the case where the value of n exceeds the maximum value N, it means that the smoothing process has been performed on all of the M×N capacitance detectors 1a, M of which may be arranged in the X direction and N of which are arranged in the Y direction that is perpendicular to the X direction in a matrix form, and that all of the M×N capacitance detectors 1a have been stored. Therefore, the operation of step S3 in the flowchart of FIG. 3 may be exited.

Figures 10A, 10B:
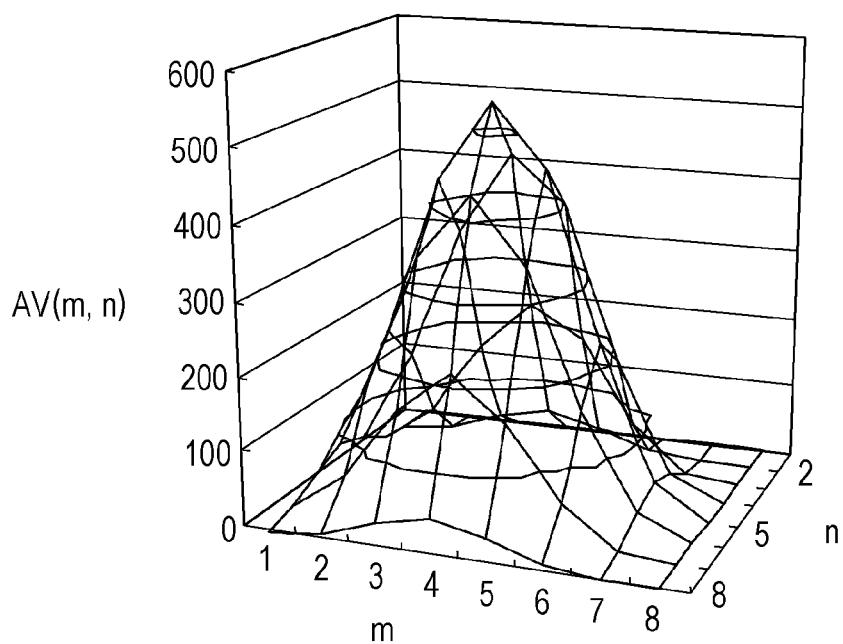
FIGS. 10A and 10B are explanatory diagrams that relate to values that are calculated in a smoothing process of FIG. 9 and on which the smoothing process has been performed.

FIGS. 10A and 10B are explanatory diagrams that relate to the values that are calculated in the smoothing process of FIG. 9 and on which the smoothing process has been performed and are diagrams illustrating the results obtained by performing the smoothing process of step S3 described above on the values (NR (m, n)) of the second data signals calculated in step S2 illustrated in FIG. 8. Note that in the case where the second data signal that corresponds to one set of the eight adjacent coordinates adjacent to the coordinates of interest is not present, the calculation may be performed using a fixed value that is 0 (zero) as the value of the second data signal that corresponds to one set of the adjacent coordinates and that is not present.

FIG. 10A illustrates the values (AV(m, n)) of the third data signals that are obtained by performing the smoothing process on the values (NR(m, n)) of the second data signals shown in FIG. 8A using the weighted average that is weighted on the basis of a Gaussian function. FIG. 10B is a contour graph showing the values of the third data signals shown in FIG. 10A.

As illustrated in FIGS. 10A and 10B, since the smoothing process may be performed using the weighted average that is weighted on the basis of a Gaussian function, noise that is superimposed on a signal along with an input operation and input at a position corresponding to the coordinates (m=5, n=4) in the measured data illustrated in FIG. 5 may be effectively reduced, and only the value illustrated in FIG. 5 at a position that corresponds to the coordinates (m=4, n=5) and at which an operation is performed by an operator is a maximum value.

As described above, the value of the second data signal (NR(m, n)) on which the noise removal process has been performed and which corresponds to the coordinates of interest and the values of the second data signals (NR(m−1, n−1), NR(m−1, n), NR(m−1, n+1), NR(m, n−1), NR(m, n+1), NR(m+1, n−1), NR(m+1, n), and NR(m+1, n+1)) on which the noise removal process has been performed and each of which corresponds to one set of the eight adjacent coordinates adjacent to the coordinates of interest are obtained from the second data signal storage area, and then, the smoothing process is performed. Therefore, a weighted average calculation with only a small influence of noise can be performed.

Since the smoothing process is a weighted average process based on a Gaussian function, the value of the third data signal corresponding to the coordinates of an operation position may become the largest value, and the value of the third data signal at a position that is spaced apart from an operation position decreases as the distance between the position and the operation position may increase. Thus, a smoothing process in accordance with the distance can be performed. As a result, the precision with which the operation position is detected can be improved.

Figure 11:
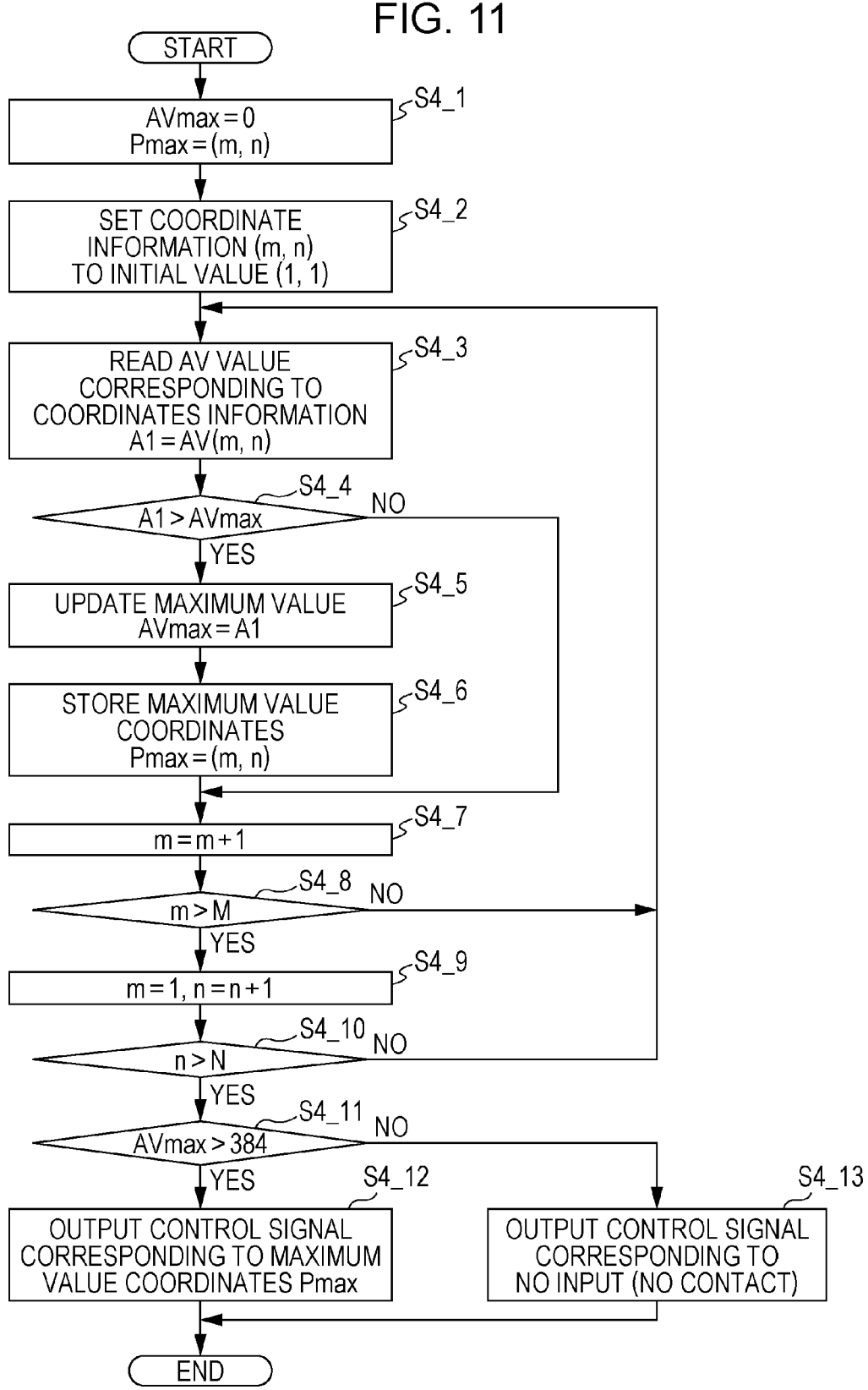
FIG. 11 is a flowchart illustrating a detailed operation procedure of step S4 of FIG. 3.
Figure 12:
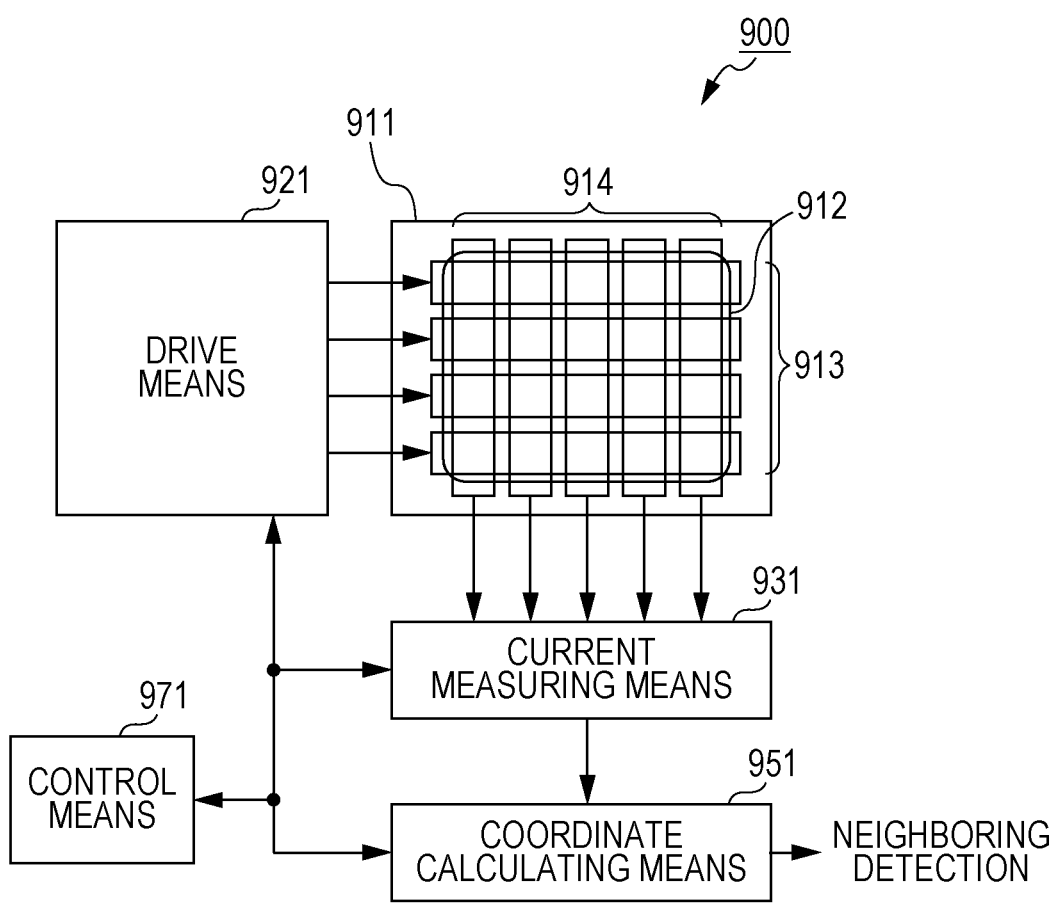
FIG. 12 is a diagram illustrating the configuration of an input device of the related art.
Figure 13:
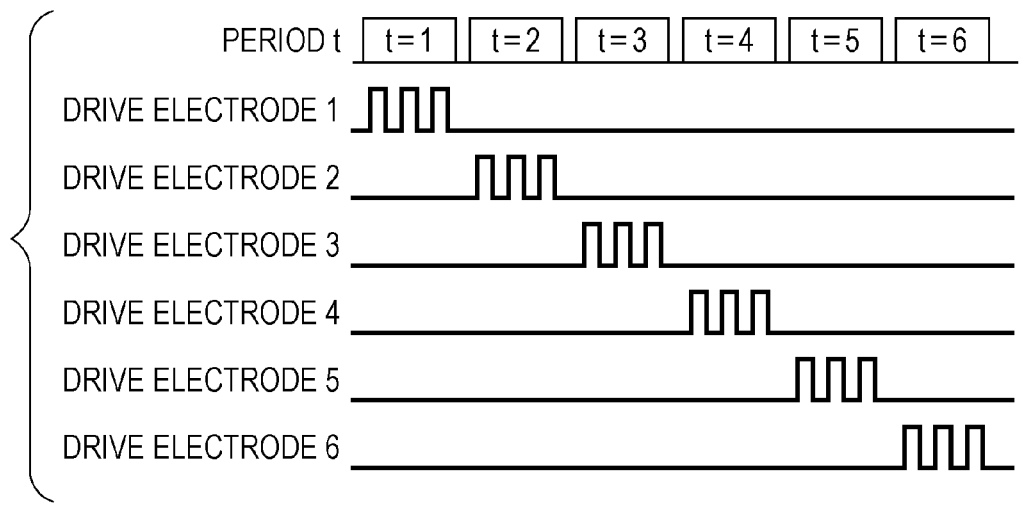
FIG. 13 is an operation timing chart of the input device of the related art.
Figure 14:
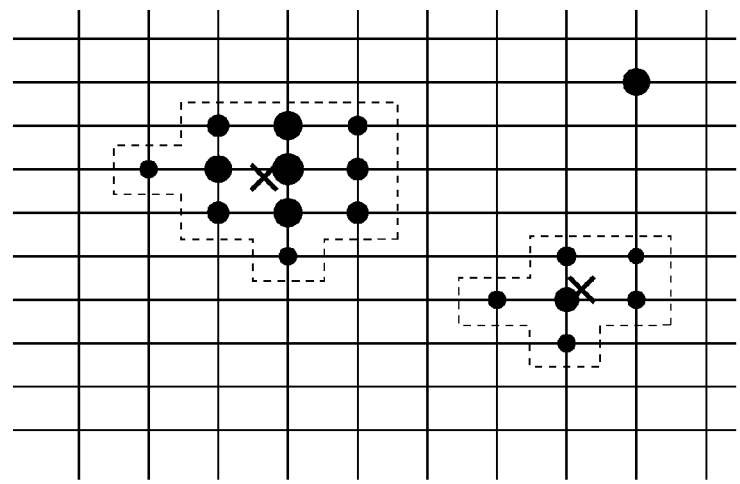
FIG. 14 is a diagram illustrating the states of a region extraction process and a weighted average calculation of the input device of the related art.

FIG. 11 is a flowchart illustrating a detailed operation procedure of an operation position calculation process of step S4 in the flowchart illustrated in FIG. 3.

In step S4_1 illustrated in the flowchart of FIG. 11, the control unit 3 may delete (or sets to zero) the value of a maximum value holding memory (AVmax) and the value of a memory (Pmax) that stores the coordinate information of a maximum value that may be used to perform a calculation for an operation position.

In step S4_2, the coordinate information that is used to perform the calculation for an operation position may be set to the initial value (m=1, n=1). In step S4_3, the value of the third data signal (AV(m, n)) on which the smoothing process has been performed and which corresponds to the coordinate information may be obtained from the third data signal storage area.

In step S4_4, the value of the third data signal (AV(m, n)) on which the smoothing process has been performed and which has been obtained in step S4_3 may be compared with the value of the maximum value holding memory (AVmax) that stores the maximum value of the third data signals (AV(m, n)) on which the smoothing process has been performed and which have been obtained. In the case where the value of the third data signal (AV(m, n)) on which the smoothing process has been performed and which has been obtained is not greater than the value of the maximum value holding memory (AVmax), the process may continue to step S4_7. The initial value of the maximum value holding memory (AVmax) may be set to zero by the process of step S4_1.

In step S4_4, in the case where the value of the third data signal (AV(m, n)) on which the smoothing process has been performed is greater than the value of the maximum value holding memory (AVmax), the value of the third data signal (AV(m, n)) on which the smoothing process has been performed may be stored in the maximum value holding memory (AVmax) in step S4_5, and the coordinate information of the third data signal (AV(m, n)) is stored in a memory that stores the coordinate information of the maximum value (Mmax=m, Nmax=n) in step S4_6. Then the process may continue to step S4_7.

In step S4_7, the value of m of the coordinate information (m, n) may be incremented by one. In step S4_8, the value of m may be compared with the maximum value M. In the case where the value of m does not exceed the maximum value M, the process may return to step S4_3. The value of the third data signal (AV(m+1, n)) on which the smoothing process has been performed and which corresponds to the next coordinate information (m+1, n) that are updated may be obtained from the third data signal storage area. Then, the process from step S4_4 to step S4_7 is repeated unless the value of m exceeds the maximum value M.

In the case where the value of m exceeds the maximum value M when the value of m is compared with the maximum value M in step S4_8, the value of m may be reset to the initial value, and the value of n may be incremented by one in step S4_9. Then, in step S4_10, the value of n may be compared with a maximum value N. In the case where the value of n does not exceed the maximum value N, the process returns to step S4_3. The value of the third data signal (AV(m, n+1)) on which the smoothing process has been performed and which corresponds to the coordinate information (m, n+1) that are updated may be obtained from the third data signal storage area. Then, the process from step S4_4 to step S4_9 may be repeated in the same manner as described above unless the value of n exceeds the maximum value N.

In the case where the value of n exceeds the maximum value N when the value of n is compared with the maximum value N in step S4_10, it means that the smoothing process has been performed on all of the M×N capacitance detectors 1a, M of which are arranged in the X direction and N of which are arranged in the Y direction that is perpendicular to the X direction in a matrix form, and that all of the M×N capacitance detectors 1a have been stored. Therefore, the process continues to step S4_11.

In step S4_11, the value of the maximum value holding memory (AVmax) may be compared with a contact threshold that is used to determine the presence of a contact as a result of an input operation. In the case where the value of the maximum value holding memory (AVmax) is larger than the contact threshold, the process continues to step S4_12. In the case where the value of the maximum value holding memory (AVmax) is not greater than the contact threshold, the process continues to step S4_13.

In step S4_12, since it is determined that a contact as a result of an input operation is present in step S4_11, a control signal corresponding to a memory (Mmax, Nmax) that stores the coordinate information of a maximum value is output, and the operation of step S4 in the flowchart of FIG. 3 may be exited.

In step S4_13, since it is determined that a contact as a result of an input operation is not present in step S4_11, a control signal corresponding to no input is output, and the operation of step S4 in the flowchart of FIG. 3 may be exited.

As described above, the values of the third data signals (AV(m, n)) on which the smoothing process has been performed are obtained from the third data signal storage area, the maximum value of the values is calculated, and it is determined whether a contact as a result of an input operation is present or not. In the case where it is determined that a contact as a result of an input operation is present, the control signal corresponding to the memory (Mmax, Nmax), which stores the coordinate information of the maximum value may be output. In the case where it is determined that a contact as a result of an input operation is not present, the control signal corresponding to no input is output. Therefore, an output according to an operation position can be obtained, and thus, a coordinate input operation can be performed.

As described above, the input device 100 according to an exemplary embodiment may include the coordinate input unit 1 that may include a plurality of capacitance detectors 1a and on which an operating body performs an operation, the capacitance measuring unit 2 that measures a capacitance of each of the plurality of capacitance detectors 1a and outputs the capacitance, which has been measured, as a measurement signal by performing an analog-to-digital conversion, and the control unit 3 that may control the capacitance measuring unit 2, obtain the measurement signal while associating the measurement signal with the coordinate information of the corresponding capacitance detector 1a, calculate a first data signal that is a difference value between the measurement signal and a reference value, perform a calculation for the first data signal, and output a control signal on the basis of the result of the calculation. In addition, the control unit 3 may perform a first calculation in which a noise removal process is performed on the first data signal and in which the first data signal, on which the noise removal process has been performed, may be associated with the coordinate information and stored as a second data signal, perform a second calculation in which a smoothing process is performed on the second data signal, which has been associated with the coordinate information and stored, and in which the second data signal, on which the smoothing process has been performed, may be associated with the coordinate information as a third data signal, and calculate an operation position using the third data signal. Therefore, the accurate coordinates of an operation position can be calculated by reducing the influence of noise, and the input device 100 has a short response time because a calculation can be performed without performing data accumulation several times. Thus, an input device with good followability with respect to an input operation and good operability can be provided.

The noise removal process may be performed using the first data signal that is associated with one set of coordinates of interest included in the coordinate information and the first data signals that are associated with a plurality of adjacent coordinates adjacent to the coordinates of interest, and the smoothing process may be performed using the second data signal that is associated with the one set of coordinates of interest included in the coordinate information and the second data signals that are associated with the plurality of adjacent coordinates adjacent to the coordinates of interest. Therefore, noise by which only the value of a particular set of coordinates becomes an abnormal value can be more effectively removed.

The smoothing process may be a weighted average process based on a Gaussian function. Therefore, the third data signal that corresponds to the coordinates of an operation position may become the largest value, and the value of the third data signal at a position that is spaced apart from the operation position decreases as the distance between the position and the operation position may increase. Thus, a smoothing process in accordance with the distance can be performed, and as a result, the precision with which the operation position is detected can be improved.

In the noise removal process, the value of the first data signal that is associated with the coordinates of interest may be replaced by the average value of the first data signals that are associated with the plurality of adjacent coordinates when the differences between the first data signal that is associated with the coordinates of interest and each of the first data signals that are associated with the plurality of adjacent coordinates become equal to or greater than an abnormal value determination threshold. Therefore, noise can be effectively removed without performing data accumulation several times.

Although the input device according to the embodiment of the present invention has been described in detail above, the present invention is not limited to the above-described embodiment, and various modifications can be made within the gist of the present invention. For example, the following modifications can be made, and the modifications are also within the technical scope of the present disclosure.

(1) Although the case where, in the various embodiments, the input device 100 and the external device 5 may be connected to each other via the interface unit 4 has been described as an example, the input device 100 need not include the interface unit 4, and the control unit 3 and the interface unit 4 may be directly connected to each other.

(2) Although the case where, in the noise removal process according to various embodiments, the average of the difference values that correspond to the four adjacent coordinates is calculated in the case where it is determined that all of the absolute values of the differences between each of the difference values that correspond to the four adjacent coordinates and the difference value that corresponds to the coordinates of interest are equal to or greater than the abnormal value detection threshold has been described as an example, the average of the difference values that correspond to the adjacent coordinates may be calculated in the case where it is determined that any one of the absolute values of the differences between each the difference values that correspond to the adjacent coordinates and the difference value that corresponds to the coordinates of interest is equal to or greater than the abnormal value detection threshold. In addition, the average of the difference values that correspond to the adjacent coordinates may be calculated in the case where the number of the absolute values that are greater than the abnormal value detection threshold is large among the absolute values of the differences between each of the difference values that correspond to the adjacent coordinates and the difference value that corresponds to the coordinates of interest.

(3) Although the operation of the noise removal process according to various embodiments in the case where the difference value of the coordinates of interest is (AD(m, n)), and the four adjacent coordinates adjacent to the coordinates of interest are (m−1, n), (m+1, n), (m, n−1), and (m, n+1) has been described, the four adjacent coordinates adjacent to the coordinates of interest may be (m−1, n−1), (m−1, n+1), (m+1, n−1), and (m+1, n+1). In addition, the noise removal process may be performed using the difference values that correspond to eight adjacent coordinates (m−1, n−1), (m−1, n), (m−1, n+1), (m, n−1), (m, n+1), (m+1, n−1), (m+1, n), and (m+1, n+1) that are adjacent to the coordinates of interest.

(4) Although the specific values of the data used by the control unit 3 have been described, the embodiments of the present disclosure may be implemented by suitably changing the values in accordance with a device to be incorporated and conceivable usage states, and the present embodiment may also be implemented by changing, in such a manner that corrections or the like are made in accordance with variations in the ambient temperature, the operating environment, and the like, the fixed values that are used as examples.

(5) Although an operation example in which an accumulation process is not performed in the noise removal process and in the smoothing process described herein, the noise removal process or the smoothing process may be performed in combination with a minimal accumulation process that does not impair the followability of the input device 100.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. An input device comprising:
a coordinate input unit that includes a plurality of capacitance detectors and on which an operating body performs an operation;
a capacitance measuring unit measuring a capacitance of each of the plurality of capacitance detectors and outputting the capacitance, which has been measured, as a measurement signal by performing an analog-to-digital conversion; and
a control unit controlling the capacitance measuring unit, obtaining the measurement signal while associating the measurement signal with coordinate information of the corresponding capacitance detector, calculating a first data signal that is a difference value between the measurement signal and a reference value, performing a calculation for the first data signal, and outputting a control signal on the basis of a result of the calculation,
wherein the control unit performs a first calculation in which a noise removal process is performed on the first data signal and in which the first data signal, on which the noise removal process has been performed, is associated with the coordinate information as a second data signal, performs a second calculation in which a smoothing process is performed on the second data signal and in which the second data signal, on which the smoothing process has been performed, is associated with the coordinate information as a third data signal, and calculates an operation position using the third data signal,
wherein the noise removal process is performed using the first data signal that is associated with one set of coordinates of interest included in the coordinate information and the first data signals that are associated with a plurality of adjacent coordinates adjacent to the coordinates of interest, and the smoothing process is performed using the second data signal that is associated with the one set of coordinates of interest included in the coordinate information and the second data signals that are associated with the plurality of adjacent coordinates adjacent to the coordinates of interest,
wherein when differences between a difference value that corresponds to the coordinates of interest and each of difference values that correspond to the four adjacent coordinates adjacent to the coordinates of interest, it is determined that the difference value that corresponds to the coordinates of interest includes noise and the average of the difference values that correspond to the four adjacent coordinates is calculated, and the difference value that corresponds to the coordinates of interest is replaced by the average value to perform the noise removal process without performing an accumulation process,
wherein the smoothing process is performed after the noise removal process and is a weighted average process based on a Gaussian function, and
wherein, in the noise removal process, the value of the first data signal that is associated with the coordinates of interest is replaced by the average value of the first data signals that are associated with the plurality of adjacent coordinates when differences between the first data signal that is associated with the coordinates of interest and each of the first data signals that are associated with the plurality of adjacent coordinates become equal to or greater than an abnormal value determination threshold.

* * * * *